A. McKINNON.
TRUCK.
APPLICATION FILED JAN. 16, 1914.

1,195,699.

Patented Aug. 22, 1916.

A. McKINNON.
TRUCK.
APPLICATION FILED JAN. 16, 1914.

1,195,699.

Patented Aug. 22, 1916.
2 SHEETS—SHEET 2.

UNITED STATES PATENT OFFICE.

ALLAN McKINNON, OF HOLYOKE, MASSACHUSETTS.

TRUCK.

1,195,699.
Specification of Letters Patent.
Patented Aug. 22, 1916.

Application filed January 16, 1914. Serial No. 812,554.

REISSUED

*To all whom it may concern:*

Be it known that I, ALLAN McKINNON, citizen of the United States, residing at Holyoke, in the county of Hampden and State of Massachusetts, have invented certain new and useful Improvements in Trucks, of which the following is a specification.

This invention relates to an improved hand truck of that type wherein a platform is vertically adjustable with respect to the bed or body of the truck.

It is the primary object of the present invention to provide an improved truck having means associated therewith whereby a vertically adjustable platform may be raised or lowered by rotation of the draft tongue employed in connection therewith; the said platform, as well as the operating mechanism therefor, being so arranged as to provide for the retention of the former in the desired adjusted position immovable except through actuation of said tongue.

The invention further resides in the provision of a truck which may be moved with facility and comparative ease in various directions; the truck being particularly adapted for transporting heavy articles, beneath which it is first arranged, the platform being then elevated to raise the article until entirely supported by the truck.

The above and additional objects are accomplished by such means as are illustrated in their preferred embodiment in the accompanying drawings, described in the following specification and then more particularly pointed out in the claims which are appended hereto and form a part of this application.

In describing my invention in detail reference will be had to the accompanying drawings wherein like characters denote like or corresponding parts throughout the several views, and in which:—

Figure 1:
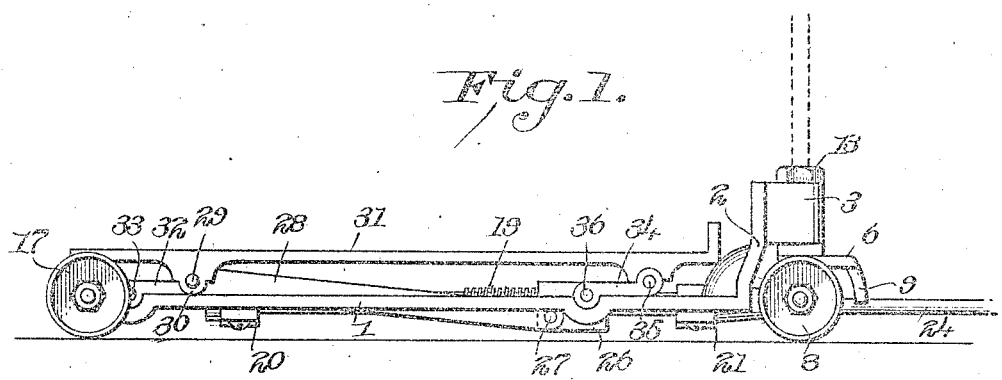
Figure 2:
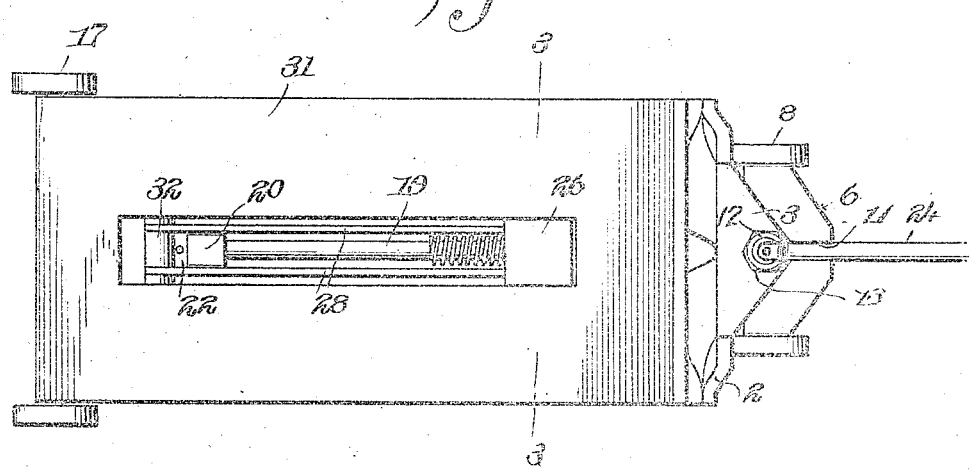
Figure 3:
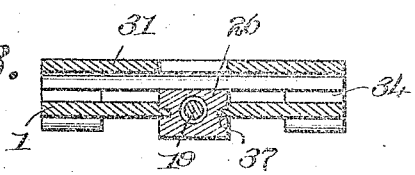
Figure 4:
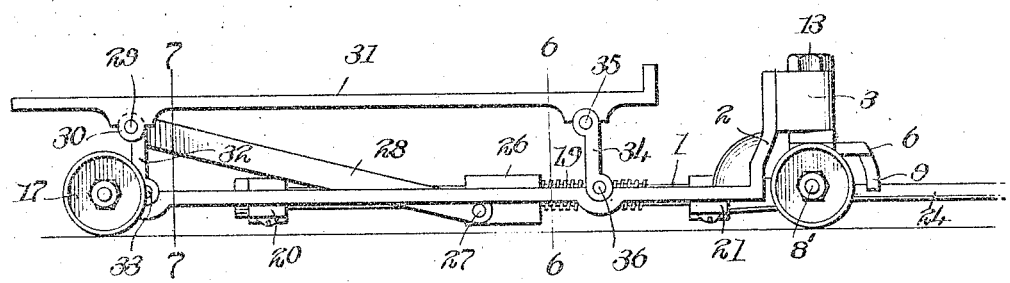
Figure 5:
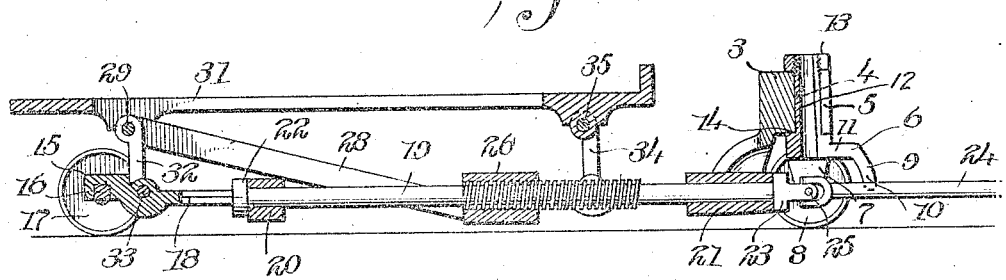
Figure 6:
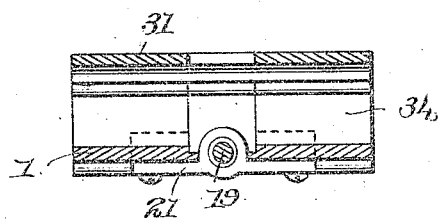
Figure 7:
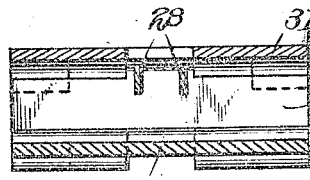

Figure 1 is a side elevation of a hand truck constructed in accordance with the present invention, the dotted lines indicating the position of the draft tongue when not in use; Fig. 2 is a top plan view; Fig. 3 is a section on the line 3—3 of Fig. 2; Fig. 4 is a side elevation, the platform being shown in raised or elevated position; Fig. 5 is a longitudinal sectional view; Fig. 6 is a section on the line 6—6 of Fig. 4; and Fig. 7 is a section on the line 7—7 of Fig. 4.

Referring now to the drawings by numeral, 1 designates as an entirety the body or bed of the truck, the forward end of which extends upwardly at an angle, the upstanding portion being designated 2. A head or enlargement 3 is carried by the upstanding portion 2, the said enlargement having a vertical bore 4, which bore, by means of a slot 5 is open to the front of the truck. Beneath the enlargement 3, and forming a support for the forward end of the body 1, I provide a suitable casting 6 within the extensions 7 of which spindles 8' are secured, the said spindles providing for the desired mounting of wheels 8 necessary to the proper support of the truck. A depending integrally formed lip 9 is provided, the said lip having a vertical slot 10 formed centrally therein, which slot together with a longitudinal slot 11 of the casting forms a continuous passageway together with the vertical slot 5 open to the vertical bore 4 of the enlargement. A slotted spindle 12 is formed integrally with the casting 6, the said spindle being disposed within the bore 4 of the enlargement 3 where it is removably retained through the medium of a nut 13 threaded thereupon, said nut being in engagement with the top face of the enlargement 3. The nut 13 is slotted to correspond with the slots in the spindle and the enlargement. An annular shoulder 14 is formed at the base of the spindle 12 against which the under fac of the enlargement 3 abuts. By the above arrangement, it is apparent that the wheels 8 of the truck, as well as the casting 6 providing a support therefor, may be swung at various angles to facilitate or render movement of the truck in various directions comparatively easy.

The opposite end of the body 1 from that upon which the upstanding portion 2 is formed is enlarged as at 15 to provide for the mounting of an axle 16 over the extremities of which the rear wheels 17 of the truck are arranged.

Extending longitudinally of the bed or body 1, preferably within an elongated opening 18 formed therein, I provide an operating screw 19 one extremity of which is journaled within a casting 20 secured to the body 1 and extending transversely of the opening 18, and the opposite end within a second casting 21 likewise fixedly secured to the said body to extend transversely of or across the said opening. The rear end of the screw 19 is enlarged as at 22, which enlargement is adapted for engagement with the casting 20 to prevent longitudinal movement of the screw in one direction, while the opposite end of the said screw has formed thereupon a joint section 23, adapted for engagement with the casting 21 to prevent longitudinal movement of the said screw in the opposite direction. To the joint section 23, the draft tongue 24 of the device is universally connected as at 25, said tongue normally operating within the slot 11 of the casting 6.

An interiorly threaded screw block 26 is mounted upon the operating screw 19, said block having pivoted thereto as at 27 one upon each side thereof suitable links or levers 28, the opposite extremities of which are arranged over a shaft 29 journaled within bearings 30 formed upon the vertically adjustable platform 31, the said bearings being preferably disposed at a point adjacent the rear end thereof. Links 32 are arranged at one end over the shaft 29 and at their opposite end over a shaft 33, the latter shaft extending parallel with the axle 16 of the truck and at a point in close proximity thereto. The shafts 35 and 36 carried respectively by the platform 31 and body 1 and connected by links 34, serve as a support for the forward end of the said platform. The links 32 and 34 being of the same length, the said platform is at all times supported in parallel relation with the said body 1.

When it is desired that the truck platform be raised from the position illustrated in Fig. 1 to the position illustrated in Fig. 4, the draft tongue 24 is rotated to impart a like movement to the operating screw 19, and as the said screw is locked against longitudinal movement, it is apparent that the screw block 26 is operated thereupon. The said screw block being connected to the platform 31 through the medium of the links 28, it is further apparent that a raising of the said platform may be effected by a continued rotation of the said tongue. When raised, the platform, or in fact the entire truck, may be locked against movement, by raising the tongue 24 into the position illustrated in dotted lines in Fig. 1 and swinging the front wheels 8 of the truck at an angle to the body, for in this manner the slot 11 is forced out of registration with the vertical slot 5, and as the said tongue is inclosed by the vertical bore of the spindle 12, it is apparent that a removal of the said tongue from the said bore cannot be effected without first alining the said slots just referred to.

If desired, the respective longitudinal edges of the body opening 18 may be disposed to fit within longitudinal grooves 37 of the block 26, this arrangement serving as an additional support whereby the said block is locked against movement other than longitudinal during a raising or lowering operation of the platform 31.

In reduction to practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claims.

Having thus fully described my invention, what I claim as new and desire to secure by Letters Patent, is:—

1. A wheel supported truck having forward steering wheels turnable about a vertical axis and a vertically movable platform, a central longitudinal screw rod, means engaging the threads of the rod and operable when the rod is rotated for moving the platform, a draft tongue, and a universal coupling located in alinement with the turnable axis of the steering wheels and connecting the tongue with the rod.

2. In combination, in a vehicle, an adjustable platform, a draft tongue rotatable about its longitudinal axis to adjust said platform, and means on the vehicle and engageable with the tongue when moved into a vertical position to lock the tongue against turning movement and the platform in its adjusted position.

3. In combination, in a vehicle, a vertically adjustable platform, a draft tongue turnable to adjust the platform, and lock means operable through turning movement of the front wheels of the vehicle to lock the tongue against turning movement and the platform in its adjusted position.

4. In combination, in a vehicle, a vertically adjustable platform, a normally horizontal but universally movable draft tongue, a connection between the tongue and the platform, said tongue being rotatable about its longitudinal axis to adjust said platform, and means on the vehicle to engage the tongue when moved into a vertical position to lock it against turning movement and the platform in its adjusted position.

5. In a vehicle, a vehicle body, a platform movable vertically relatively to said body, a casting pivoted to the said body, said casting forming a support for the front wheels of the vehicle, a draft tongue, means actuatable through a turning of the said tongue to move said platform relatively to the body, said draft tongue being movable into various positions relatively to the casting, a turning of the casting relatively to the body when the said tongue is in an upright position serving as a means whereby the said tongue is locked in such upright position and against rotation, as and for the purpose set forth.

6. In a vehicle, an adjustable platform, a draft tongue rotatable about its longitudinal axis to adjust said platform, and a means to engage with the tongue when raised to a vertical position to lock said tongue against turning movement and in such vertical position.

7. In a vehicle, an adjustable platform, a draft tongue turnable to adjust said platform, a casting turnable relatively to the vehicle and forming a part thereof, said casting having a vertical slot formed therein, a fixed member supporting said casting and provided with a slot for registry with the slot of said casting, a guide means formed upon said casting to guide the draft tongue to a vertical position subsequent to adjustment of the platform, said tongue being locked in such vertical position through turning movement of said casting relatively to the vehicle, substantially as described.

In testimony whereof I affix my signature in presence of two witnesses.

ALLAN McKINNON.

Witnesses:
LAUCHLIN McKINNON,
ROBERT M. THOMPSON.